United States Patent
Katayama et al.

(10) Patent No.: US 8,971,397 B2
(45) Date of Patent: Mar. 3, 2015

(54) ON-THE-FLY COMPENSATION OF SAMPLING FREQUENCY AND PHASE OFFSET IN RECEIVER PERFORMING ULTRA-HIGH-SPEED WIRELESS COMMUNICATION

(75) Inventors: Yasunao Katayama, Kawasaki (JP); Yasuteru Kohda, Kawasaki (JP); Daiju Nakano, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/004,333

(22) PCT Filed: Mar. 2, 2012

(86) PCT No.: PCT/JP2012/055403
§ 371 (c)(1),
(2), (4) Date: Sep. 10, 2013

(87) PCT Pub. No.: WO2012/121151
PCT Pub. Date: Sep. 13, 2012

(65) Prior Publication Data
US 2014/0003485 A1    Jan. 2, 2014

(30) Foreign Application Priority Data
Mar. 10, 2011    (JP) .................................. 2011053312

(51) Int. Cl.
| | |
|---|---|
| H03H 7/30 | (2006.01) |
| H03K 5/159 | (2006.01) |
| H04L 27/01 | (2006.01) |
| H04L 7/00 | (2006.01) |
| H04L 27/22 | (2006.01) |
| H04L 27/38 | (2006.01) |
| H04L 7/10 | (2006.01) |

(52) U.S. Cl.
CPC .............. *H04L 27/01* (2013.01); *H04L 7/0029* (2013.01); *H04L 27/22* (2013.01); *H04L 27/38* (2013.01); *H04L 7/10* (2013.01)
USPC ............ 375/233; 375/229; 375/350; 375/354

(58) Field of Classification Search
CPC ...... H04L 7/0029; H04L 27/01; H04L 7/0058
USPC .......................... 375/233, 229, 329, 350, 354
See application file for complete search history.

(56) References Cited

U.S. PATENT DOCUMENTS 6,141,378 A * 10/2000 d'Oreye de Lantremange ................ 375/232

(Continued)

FOREIGN PATENT DOCUMENTS

| JP | 7-22988 A | 1/1995 |
|---|---|---|
| JP | 7-115446 A | 5/1995 |

(Continued)

OTHER PUBLICATIONS

Search Report, European Patent Office, 12754784.2 mailed Feb. 21, 2014.

*Primary Examiner* — Qutbuddin Ghulamali
(74) *Attorney, Agent, or Firm* — Scully, Scott, Murphy & Presser, P.C.; Gail H. Zarick, Esq.

(57) ABSTRACT

Received data oversampled twice is polyphased by the receiver, feedback is applied using an adaptive algorithm, and the filter coefficients (tap coefficient sequence) of a compensation filter are simultaneously shifted when the data shifts. The sampling frequency and the phase offset can be compensated for on the fly using a filter combining a tapped filter whose initial value is a correlation value obtained from the preamble and header of a received signal, and a wavefront aligner. In this configuration, a resampling filter circuit, an equalization filter circuit and a decimation filter circuit are realized in a single compensation filter circuit, which is much smaller than the prior art circuits in terms of size.

10 Claims, 5 Drawing Sheets

(56) References Cited

U.S. PATENT DOCUMENTS

| | | | |
|---|---|---|---|
| 6,973,141 B1 * | 12/2005 | Isaksen et al. | 375/308 |
| 7,170,957 B2 | 1/2007 | Moy et al. | |
| 2004/0088609 A1 | 5/2004 | Eckhardt et al. | |
| 2004/0243258 A1 * | 12/2004 | Shattil | 700/73 |

FOREIGN PATENT DOCUMENTS

| | | |
|---|---|---|
| JP | 10-341193 | 12/1998 |
| JP | 2003-32313 A | 1/2003 |
| JP | 5-260108 A | 9/2013 |
| WO | WO 03/049309 | 6/2003 |

* cited by examiner

| Received Data Series | Tap Coefficient |
|---|---|
| Odd Phase: 5 3 1 / Even Phase: 6 4 2 (from 7 6 5 4 3 2 1). Normal form. | 3rd, 2nd, 1st. → $W_5$ $W_3$ $W_1$ / $W_6$ $W_4$ $W_2$. Normal form when tap coefficient $W_3$ is at maximum. |
| Odd Phase: 4 2 1 / Even Phase: 5 3 1 (from 7 6 5 4 3 2 1). 1st data set is repeated when the sampling frequency of the receiver is slower than that of the transmitter. | $W_4$ $W_2$ 0 / $W_5$ $W_3$ $W_1$. Maximum tap coefficient shifts because of transition from $W_3$ to $W_2$. |
| Odd Phase: 6 4 2 / Even Phase: 7 5 3 (from 7 6 5 4 3 2 1). 1st data set is skipped when the sampling frequency of the receiver is faster than that of the transmitter. | $W_6$ $W_4$ $W_2$ / 0 $W_5$ $W_3$. Maximum tap coefficient shifts because of transition from $W_3$ to $W_4$. |

FIG. 5

(a) Before Restoration    (b) After Restoration

ON-THE-FLY COMPENSATION OF SAMPLING FREQUENCY AND PHASE OFFSET IN RECEIVER PERFORMING ULTRA-HIGH-SPEED WIRELESS COMMUNICATION

TECHNICAL FIELD

The present invention relates, in general, to the restoration of data on the receiver end in wireless communication and, more specifically, to a method of compensating for an offset between a sampling frequency and a symbol rate in a symbol sequence and a phase offset on the receiver end.

BACKGROUND ART

Ultra-high-speed wireless communication technologies, typified by millimeter-wave wireless communication using the 60 GHz band, are being researched and developed in which data rates exceeding one gigabit per second have been realized. When data rates exceed one gigabit per second, various challenges arise in wireless communication transmitters and receivers. In typical wireless communication, data is sent and received by the transmitter and receiver at different frequencies. This is due to the accuracy of the oscillator generating the clock supplied to the digital circuits in the transmitter and the receiver, circuit mounting conditions, and temperature conditions.

When the symbol timing for the baseband signals of the transmitter and the receiver have different frequencies, sampling is performed in the center of the eye pattern immediately after synchronization, but the sampling position gradually shifts forward or backward in accordance with the frequency offset. Eventually, the boundary of the eye pattern is reached, symbols cannot be accurately determined, and data restoration fails. Therefore, there is a need to compensate for these frequency offsets.

High-speed compensation must be performed to compensate for frequency offsets in ultra-high-speed communication, and compensation must be performed on each packet when packet communication is expected. One technique for restoring the symbol time of a transmitter is to use an analog PLL (phase synchronization circuit). However, several thousand clocks occur before synchronization with the frequency of the received signals, and high-speed synchronization is not possible. Also, when sampling is performed using an analog-to-digital converter (ADC), the symbol time is very short, and oversampling can be performed at most only several times.

In the technique disclosed in Patent Literature 1, resampling is performed on received signals at the desired sample time using a digital resampling circuit. The resampling circuit is realized by performing interpolation and decimation at the appropriate ratio using a polyphase filter. Instead of directly tinkering with the sampling frequency of the ADC, resampling is realized using a digital circuit. Also, frequency offset compensation and equalization such as inter-symbol interference (ISI) cancellation are performed using filters in a subsequent stage, and data decimation is performed after this to obtain the original symbol rate. This method takes a long time to determine the coefficient of the resampling circuit, and the circuit configuration is large.

CITATION LIST

Patent Literature

Patent Literature 1 WO 97/27695 (Domestic Published Unexamined Patent Application No. 2000-504166 in Japanese for Designated State JP)

SUMMARY OF INVENTION

Technical Problems

In view of these situations, the wireless communication system and conditions that are the objects of the present invention can be summarized by (A)-(E).

(A) Sampling received signals I and Q using ADC in a single-carrier wireless communication system.

(B) High-speed on-the-fly compensation by a digital circuit in which nothing is fed back to the local clock of the receiver.

(C) The oversampling factor (predetermined number of oversamplings) is less than a factor of ten, and preferably a factor of two.

(D) There is no dependence on the content of the data payload. In other words, compensation is performed without using a training sequence or pilot words, which are known patterns.

(E) It uses a power-saving circuit that is as small as possible.

Solution to Problems

The present invention does not match the sampling frequency of the receiver to the frequency of the transmitter by altering the frequency of the receiver clock or changing the coefficients of a resampling circuit. Offset compensation is performed by polyphasing received data oversampled using a predetermined number of oversamplings (for example, twice), and shifting the filter coefficient of the compensation filter as the data shifts.

In a receiver for wireless communication according to the present invention, received signals oversampled by an ADC are passed through a filter combining a tapped filter whose initial value is a correlation value obtained from the preamble or header of the received signals with a wavefront aligner. In this way, sampling frequency and phase offsets can be compensated for on the fly without matching the clock of the receiver to the clock of the transmitter.

Effect of the Invention

The technique of the present invention can eliminate the time required to adjust the sampling frequency of the receiver, and perform on-the-fly compensation. In this configuration, the resampling filter circuit, equalization filter circuit and decimation filter circuit in Patent Literature 1 can be realized in a single compensation filter circuit, which is much smaller than the prior art circuits in terms of size.

DESCRIPTION OF EMBODIMENT

Figure 1:
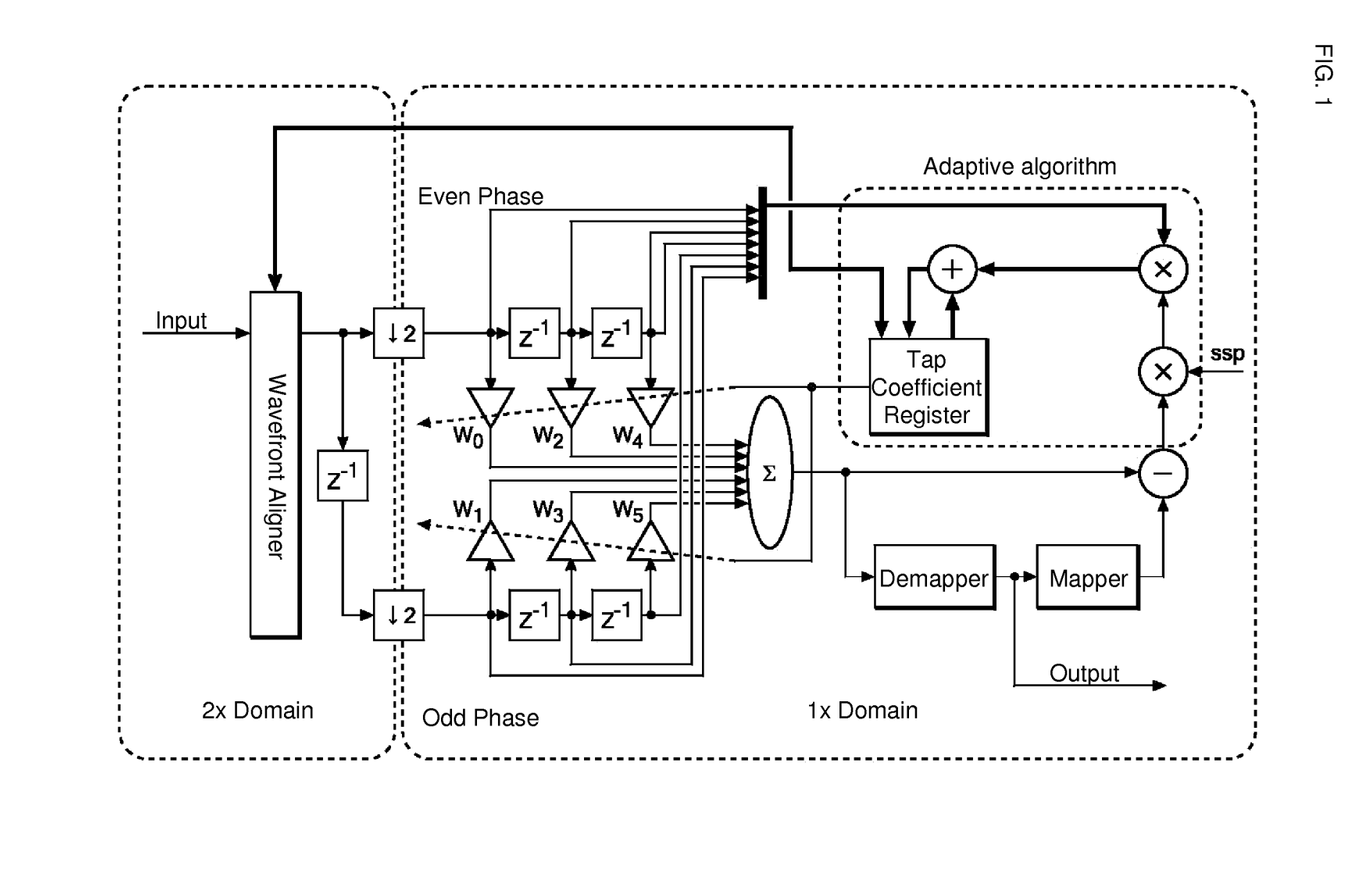
FIG. 1 is a diagram showing the basic circuit configuration of a receiver used in the present invention.

FIG. 1 is a diagram showing the basic circuit configuration of a receiver used in the present invention.

Figure 2:
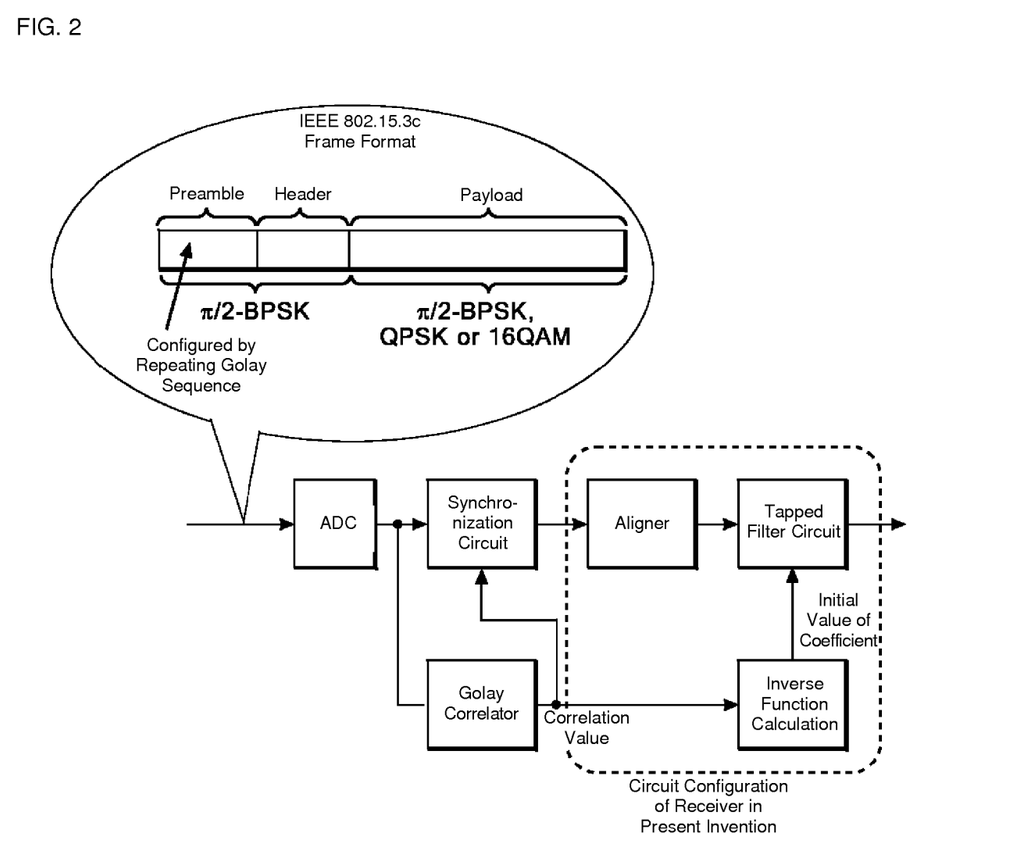
FIG. 2 is a diagram showing the circuit configuration of a receiver including the present invention.

FIG. 2 is a diagram showing the circuit configuration of a receiver including the present invention. The present invention will be explained first with reference to FIG. 2. In a receiver for wireless communication, signals received by an RF circuit are oversampled by an ADC. In the following explanation, the sampling factor (number of oversamplings) is two, but applications of the present invention are not limited to a factor of two.

First, the beginning of a frame is detected in oversampled received signals using a synchronization circuit. For example, as defined in IEEE 802.15.3c, a millimeter wave PAN frame is divided into three sections: a preamble, a header, and a payload. The preamble comprises a Golay sequence, which is a known pattern with a strong autocorrelation.

The synchronizing circuit uses a Golay correlator to detect the Golay sequence, and then detect the preamble. This is used to perform frame synchronization and symbol synchronization, find the beginning position of the header, and correctly restore data. The Golay correlator is merely an example. Any sequence and correlator with strong autocorrelation can be used.

The output from the correlator comprises a correlation value and its timing. The correlation value is the average value from a repeating Golay sequence and is thus a more accurate value. The timing is used to identify the position of the header with a synchronization circuit. However, a correlation value can be used with the tapped filter (explained below). The main circuit configuration related to the present invention is within the dashed lines in FIG. 2, and uses the output from the synchronization circuit whose timing has been corrected, and the correlation value that is outputted from the correlator. An inverse function calculation is performed on the correlation value to provide the initial value for the tap coefficient (explained below).

(1) Tapped Filter

The output from the synchronization is the input in FIG. 1. When oversampled at a factor of two, the rate is twice the rate of the original symbol rate (2× domain in the figure). When down-sampled based on the inverse of two (½), two types of decimated received symbol sequences can be obtained from each one. These are called "even phase" and "odd phase" received symbol sequences.

Of course, received symbol sequences in which there are three or more types of phase shift can also be generated. When the oversampling factor is not a multiple of an integer and the oversampling factor is expressed as the nearest lowest-term fraction, an integer number of received symbol sequences can be obtained by creating interpolation data using a factor of the denominator. In this way, resolving symbol rates into a plurality of received symbol sequences is called "polyphasing" or "polyphase resolution".

Immediately following the wavefront aligner in FIG. 1 is a circuit for dividing the symbol rate into two sequences and performing down-sampling using a rate that is the inverse of 2, or half the rate. Because the oversampling factor is two, the down-sampling rate is the inverse of two (½). $Z^{-1}$ (Z to the power of −1) is the delay element (latch), which creates a delay of one oversampling rate portion and shifts the timing in a relative sense.

Immediately after synchronization, the sampling position of at least the even phase or the odd phase should be located near the center of the eye pattern. "Wavefront" refers to the signal wavefront, and the act of aligning an even phase and odd phase signal with the same symbol is called "aligning". Here, the wavefront aligner does not (yet) act on the data in the received symbol sequences.

A tapped filter is connected to each of the phase-resolved received symbol sequences. Because phase resolution occurs after the tapped filter, the operation is performed using all of the original symbol rates (that is, the down-sampled symbol rate) (the 1× domain in the figure). As a result, the operating frequency can be kept low regardless of the number of oversamplings (the oversampling factor). Even though the circuit size is increased based on the number of polyphases and the symbol rate exceeds one Gbps in the current technology, the impact on circuit size is negligible and the structure is compact even when the decimation filter is included because oversampling is not performed more than twice.

The tapped filter has the configuration of a FIR digital filter of finite length in which the delay elements are lined up in series. In the figure, the filter has a "three-tap configuration" which includes two delay elements (latches). A tap is the number of edges at which a delayed (timing-shifted) signal is sent to a multiplier. Three multipliers are used in a three-tap configuration. Because the number of multipliers must correspond to the number of polyphases, six multipliers overall are depicted in the figure. In this figure, tap coefficient sequences with at least three variables are provided (one sequence of W0, W2, W4 for the even phase, and one sequence of W1, W3, W5 for the odd sequence).

The multiplier performs complex multiplication, and a coefficient (W) is provided by a tap coefficient register (weight register). The multiplier outputs for all of the taps are added together, and outputted at the symbol rate. In the figure, W0, W1, W2, W3, W4 and W5 are added (Σ) together as the multiplier outputs. This is the filter output. A tapped filter with this configuration performs two functions: providing the appropriate tap coefficient for correcting deviations in received signals due to inter-symbol interference and sampling frequency offsets, and properly decimating the interpolation ratio between the even phase and the odd phase.

When an even simpler configuration is desired, the timing of at least two received symbol sequences that have been polyphased can be shifted at least one stage. (Even when there are ten polyphases, two polyphases can be used and the other eight (ten minus two) can be ignored. Here, four multipliers are sufficient for a "two-tap configuration" as a single delay element (latch) is included. Also, tap coefficient sequences with at least two variables are sufficient for each of at least two received symbol sequences (one sequence of W0, W2 for the even phase, and one sequence of W1, W3 for the odd sequence).

An existing "adaptive algorithm" is used to provide the appropriate tap coefficient. A described relationship between the size of the tap coefficients and the received symbol sequences is used as the size of the tap coefficients changes. In the figure, W0, W1, W2, W3, W4 and W5 are added (Σ) together as the multiplier outputs, but this corresponds to (a portion of) the configuration of the "described relationship". Feedback from the adaptive algorithm is applied to the subsequent down-sampled symbol rate.

The adaptive algorithm can be a least mean square (LMS) algorithm or a recursive least square (RLS) algorithm. In FIG.

1, an LMS algorithm is depicted in the simplest circuit configuration. The output from the tapped filter is used for symbol determination in a subsequent demapper, and the difference between the correct symbol position and the received symbol is fed back as an error vector. This error vector is multiplied by a feedback gain called a step size parameter (SSP), and then multiplied by the input vector of the tapped filter. When the input vector is a complex number, multiplication with the final input vector is performed by taking the complex conjugate.

The result is the amount of change in the size of the tap coefficient, and is added to the tap coefficient stored in the register and stored anew in the tap coefficient register (weight register). When another adaptive algorithm is used, the amount of change in the size of the tap coefficient is calculated, and the content of the register is updated in the same way. The adaptive algorithm does not depend on a specific pattern in the data, the operation is continuous from the initial value set immediately after synchronization until the end of the frame, and the size of the tap coefficient is changed adaptively on the fly. In the configuration example shown in FIG. 1, the update of the tap coefficient is at the symbol rate, but the update can also be performed by averaging the number of symbols.

The operation to compensate for sampling frequency/phase offsets on the fly is performed by combining a tapped filter with an adaptive algorithm as described above. At this time, the sampling position gradually changes, but the size of the tap coefficient changes sequentially in accordance with this change. This will now be explained with reference to FIG. 3.

Figure 3:
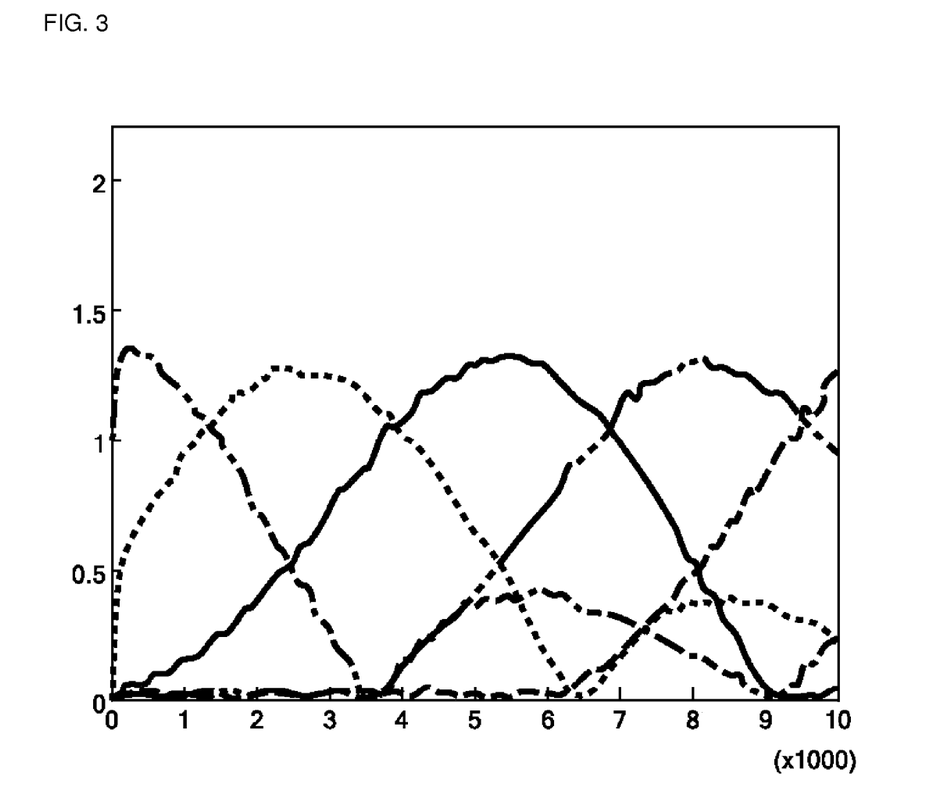
FIG. 3 is a graph showing the change in the size of tap coefficients when frequency offsets occur.

FIG. 3 is a graph showing the change in the size of the tap coefficients when frequency offsets occur. The vertical axis indicates the size, and each peak indicates the size of each tap coefficient. The leftmost peak is the first tap coefficient from the right end of the even phase, the next peak is the first tap coefficient from the right end of the odd phase, the middle peak is the second tap coefficient from the right end of the even phase, and the next peak is the second tap coefficient from the right end of the odd phase. The position of the tap with the largest value shifts back and forth sequentially. The three-tap configuration in FIG. 1 is used in FIG. 3.

(2) Initial Value of Tap Coefficient

In coherent detection, there are two ADCs. One is located in the I channel and the other is located in the Q channel. The combination of their outputs is represented by a single symbol, and symbol mapping/demapping usually occurs on a plane called the IQ plane. In other words, this is consistent with the complex representation of the symbol by I and Q, and the correlation value calculated using these values is a complex number.

The correlation values outputted from the correlation are created from a pattern with strong autocorrelation. The size represents the strength of the correlation, and the phase represents the phase shift between the transmitted carrier and the received carrier. When there has been mufti-path interference and inter-symbol interference (the waveform corresponding to the symbol has been distorted, and interferes with an adjacent symbol would occur), the channel response appears as an output sequence of correlation values. By using these as the initial values in the tapped filter, the tapped filter can begin operations properly.

Because the correlation value output sequence corresponds to the impulse response of the channel, the inverse response has to be calculated (corresponding to the inverse function calculation in FIG. 2). The channel response including mufti-path interference and inter-symbol interference is represented by a Z-conversion $H(z)$. When the transmitted symbol sequence is $X(z)$ and the received symbol sequence is $Y(z)$, the following equation is obtained.

$$Y(z)=H(z)\times(z)$$

Here, z represents the symbol rate. The tapped filter may determine the tap coefficient as $1/H(z)$ because a coefficient is required to restore $X(z)$ from $Y(z)$.

Because an IIR digital filter configuration has been used up to this point, a Taylor expansion is performed at $z=0$ to obtain an FIR-type digital filter configuration. Here, the zero-order, first-order, second-order, etc. coefficients are assigned to the tap coefficient. At this time, the tap coefficient is a complex number. The number of taps depends on the delay spread of the response in the assumed channel, but specifications may be provided in advance. Because three taps are shown in FIG. 1, the zero-order, first-order and second-order coefficients can be used. The initial value for a tap coefficient determined from correlation values in this manner is set immediately after synchronization. If an appropriate tap coefficient is not provided, the adaptive operation is begun from the value different from the tap coefficient of the appropriate initial value without the initial value being set to a fixed value such as all zeroes. As a result, it takes time to adapt, and the correct output cannot be provided in the initial portion of the frame.

(3) Wavefront Aligner

As mentioned in (1), sampling frequency/phase offsets can be compensated for using the combination of a tapped filter and an adaptive algorithm. However, because the number of taps is finite, compensation can no longer be performed when the sampling position reaches the end of the taps. Therefore, the size of the tap coefficients is always compared, and the position of the tap coefficient with the largest value is constantly monitored.

It may be set in the center of the eye pattern of the initial value (that is, the zero-order value in (2)), but the sampling frequency of neither the transmitter nor the receiver is known early. Therefore, it may be set to a tap as closest as possible to the center. At this point, a three-tap configuration (or a configuration with more than three taps) is better than a two-tap configuration for setting the tap near the center.

Because the position is the position of the tap coefficient that indicates the largest value for the initial value, the position of the tap with the largest value is moved to the adjacent tap after synchronization in accordance with the operation of the tapped filter while the wavefront aligner replaces the data sequence. At the same time, the positions of all of the tap coefficients are shifted so that the tap coefficient with the largest value is in the same tap position as the initial value.

Figure 4:
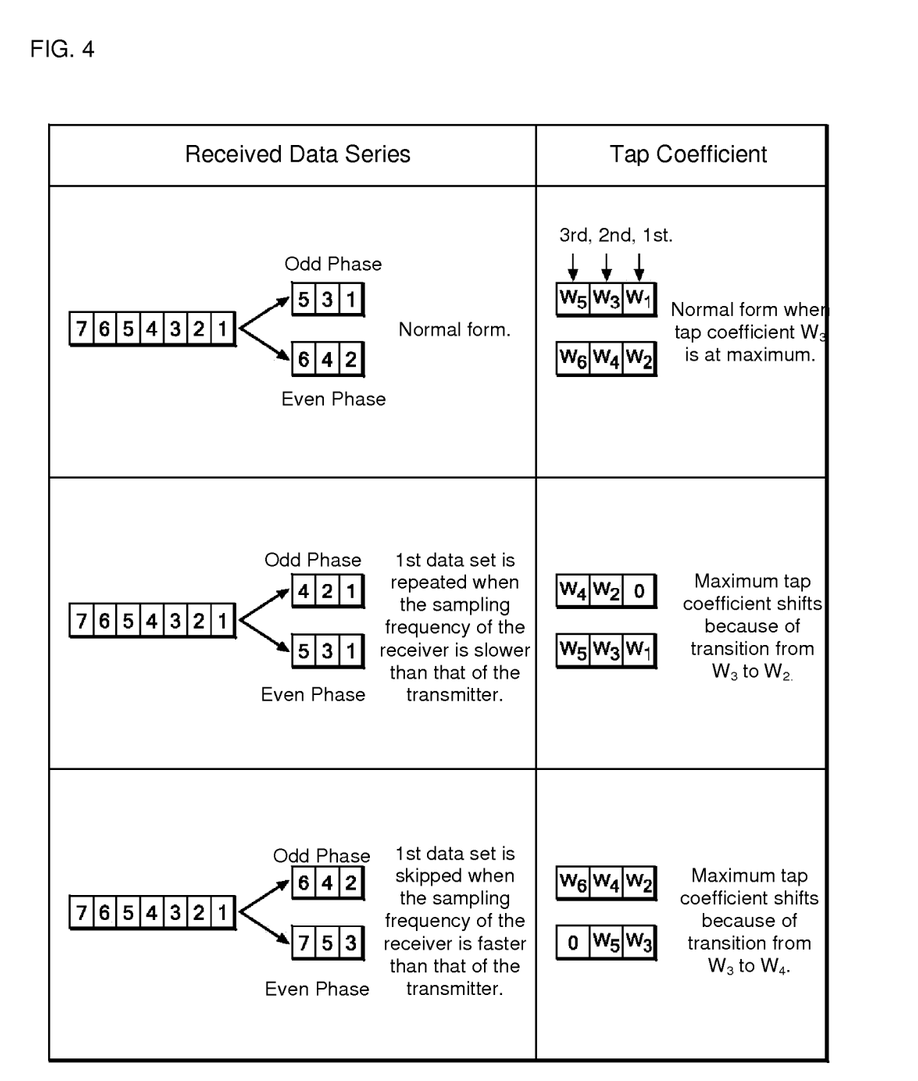
FIG. 4 is a diagram used to explain the basic operations in the method of the present invention.

FIG. 4 is a diagram used to explain the basic operations in the method of the present invention. First, when there are three taps for both the even phase and the odd phase, it is assumed that the position of the tap coefficient with the largest value after synchronization is the second one for the odd phase (W3 in FIG. 4). Because this is dependent on how the initial value is set, it can be set in this manner. The wavefront aligner initially distributes odd phases and even phases in order from the beginning of the header.

If the sampling frequency of the receiver is slower than the symbol rate of the transmitter, the sampling position gradually shifts to an earlier position time wise. This means the position of the tap coefficient indicating the largest size shifts from the second odd phase to the first even phase. At this time, the wavefront aligner shifts the tap coefficient so that the position of the shifted tap coefficient with the maximum value is returned to the second odd phase. At the same time, the allocation of the data series is changed. At this time, the sampling frequency of the receiver is slower than the original symbol rate, and an overlap of a single symbol occurs (middle rows of FIG. 4). In this way, the position of the tap coefficient with the largest size can be kept from changing.

Next, when the sampling frequency of the receiver is faster than the symbol rate of the transmitter, the opposite situation occurs. The position of the tap coefficient with the largest size shifts from the second odd phase to the second even phase (bottom rows of FIG. 4). In other words, because W4 has the largest value, the wavefront aligner shifts the tap coefficient, and then shifts all tap coefficients so that W4 is positioned at the second odd phase. At the same time, a single symbol is skipped in the data series distribution.

The position of the tap coefficient with the largest value is constantly monitored in this way. When the position has shifted to the adjacent phase, the positions of the data series and all of the tap coefficients are shifted at the same time to return the tap coefficient with the largest value to its original position. In this way, sampling frequency/phase offset compensation can be continued using a finite number of taps. When the number of oversamplings (oversampling factor) is greater than two, the number of received symbol sequences which have been polyphased is also greater than two. However, when the principles of the present invention are applied to this case, a timing shift of at least one stage is performed on each of at least two received symbol sequences that have been polyphased. This makes it possible to use the technical concepts of the present invention.

Use of (1) the tapped filter, (2) the initial value for the tap coefficient, and (3) the wavefront aligner described above makes it possible to configure a compact filter circuit for a wireless receiver which is able to handle received signals oversampled by an ADC at the symbol rate without having to match the clock of the receiver to the clock of the transmitter, and without having to reference the content of the data. It also makes continuous on-the-fly sampling frequency/phase offset compensation possible using a finite number of taps.

Figure 5:
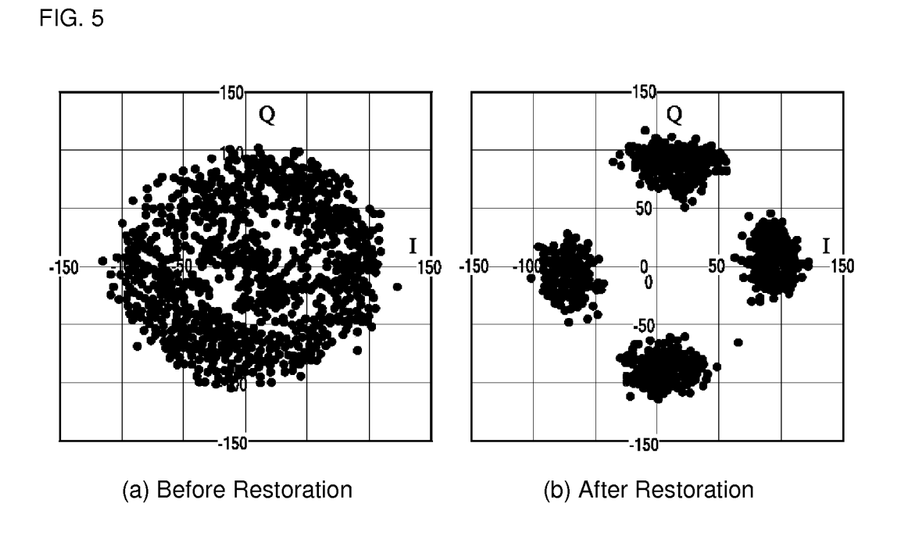
FIG. 5 is a diagram showing actual results from measurements performed using the method of the present invention.

FIG. 5 is a diagram showing actual results from measurements performed using the method of the present invention. When the modulation scheme is QPSK, the sampling frequency offset of the transmitter and receiver is 50 ppm, and the present invention is not used, the sampling position shifts on the IQ plane as illustrated by the "before recovery" situation in (a), and recovery becomes impossible. When the present invention is used, the original constellation can be recovered as illustrated by the "after recovery" situation in (b).

The basic circuit configuration of the receiver used in the present invention as shown in FIG. 1 can be realized using hardware resources, software resource, or hardware resources and software resources working together. The basic circuit configuration of the receiver can also be realized as a method including a plurality of steps for processing transmitted symbol sequences, or a program including a plurality of program codes for executing these steps in a computer serving as the receiver.

The invention claimed is:

1. A method for performing on-the-fly compensation on an offset between a sampling frequency and a symbol rate in a symbol sequence, and a phase offset in a receiver in order to restore data in a transmitted symbol sequence, the method comprising the steps of:

generating a plurality of polyphase-resolved received symbol sequences corresponding to the number of polyphases by shifting the relative timing when a received symbol sequence oversampled based on a predetermined number of oversamplings is down-sampled based on the inverse of the predetermined number of oversamplings, the received symbol sequences being two types of symbol sequences: a symbol sequence having an odd phase and a symbol sequence having an even phase when the predetermined number of oversamplings is two;

shifting by at least one step the timing of at least two of the received symbol sequences that have been polyphased to obtain at least two received symbol sequences;

providing tap coefficient sequences with at least two variables for at least two of the received symbol sequences that have been obtained;

applying feedback from an adaptive algorithm to subsequent down-sampled symbol rates in order to input a described relationship according to a size of the tap coefficients and the received symbol sequences as the size of the tap coefficients changes;

monitoring the position of the tap coefficient indicating the maximum size among a plurality of tap coefficients based on a comparison of the sizes of the tap coefficients; and shifting the positions of all tap coefficients and simultaneously skipping or overlapping any one of the oversampled received symbol sequences when the position of the monitored tap coefficient indicating the maximum size has moved to a different adjacent tap coefficient position.

2. The method according to claim 1 further comprising the steps of:

shifting by at least two steps the timing of at least two of the received symbol sequences that have been polyphased to obtain at least three received symbol sequences; and providing tap coefficient sequences with at least three variables for at least two of the received symbol sequences that have been obtained.

3. The method according to claim 1, wherein the initial value of the tap coefficient is established as $$X(z)=1/H(z)Y(z)$$

where z indicates the symbol rate
in order to represent the response of a channel including multi-path interference and inter-symbol interference as a Z-conversion $H(z)$ and to restore a transmitted symbol sequence $X(z)$ from a received symbol sequence $Y(z)$, and
zero-order, first-order, and second-order, coefficients are assigned to the tap coefficient by performing a Taylor expansion at $z=0$ to obtain an FIR-type digital filter configuration.

4. A receiver for performing on-the-fly compensation on an offset between a sampling frequency and a symbol rate in a symbol sequence, and a phase offset in order to restore data in a transmitted symbol sequence, the receiver comprising:

a latch for generating a plurality of polyphase-resolved received symbol sequences corresponding to the number of polyphases by shifting the relative timing when a received symbol sequence oversampled based on a predetermined number of oversamplings is down-sampled based on the inverse of the predetermined number of oversamplings, the received symbol sequences being two types of symbol sequences: a symbol sequence having an odd phase and a symbol sequence having an even phase when the predetermined number of oversamplings is two;

at least one latch for shifting by at least one step the timing of at least two of the received symbol sequences that have been polyphased to obtain at least two received symbol sequences;

tap coefficient sequences with at least two variables for at least two of the received symbol sequences that have been obtained;
an adaptive algorithm for applying feedback to subsequent down-sampled symbol rates in order to input a described relationship according to a size of the tap coefficients and the received symbol sequences as the size of the tap coefficients changes; and
a wavefront aligner for monitoring the position of the tap coefficient indicating the maximum size among a plurality of tap coefficients based on a comparison of the sizes of the tap coefficients, and shifting the positions of all tap coefficients and simultaneously skipping or overlapping any one of the oversampled received symbol sequences when the position of the monitored tap coefficient indicating the maximum size has moved to a different adjacent tap coefficient position.

5. The receiver according to claim 4 further comprising:
a series of two or more latches for shifting by at least two steps the timing of at least two of the received symbol sequences that have been polyphased to obtain at least three received symbol sequences; and
tap coefficient sequences with at least three variables for at least two of the received symbol sequences that have been obtained.

6. The receiver according to claim 4, wherein the initial value of the tap coefficient in the tap coefficient register with the adaptive algorithm is established as $$X(z)=1/H(z)Y(z)$$

where z indicates the symbol rate
in order to represent the response of a channel including multi-path interference and inter-symbol interference as a Z-conversion H(z) and to restore a transmitted symbol sequence X(z) from a received symbol sequence Y(z), and
zero-order, first-order, second-order, etc. coefficients are assigned to the tap coefficient when a Taylor expansion is performed at z=0 to obtain an FIR-type digital filter configuration.

7. The receiver according to claim 4 further comprising:
an analog-to-digital converter (ADC) for oversampling the transmitted symbol sequences;
a synchronization circuit connected to the ADC for detecting the beginning of a frame; and
a Golay correlator connected to the ADC for detecting a Golay sequence;
wherein a preamble is detected by detecting a Golay sequence, and frame synchronization and symbol synchronization are performed to find the beginning position of the header.

8. A computer program product executed in a receiver for performing on-the-fly compensation on an offset between a sampling frequency and a symbol rate in a symbol sequence, and a phase offset in a receiver in order to restore data in a transmitted symbol sequence, the program product comprising:
a non-transitory storage medium readable by a processing circuit in said receiver, said medium having encoded thereon:
first program code executable by the receiver to cause the receiver to generate a plurality of polyphase-resolved received symbol sequences corresponding to the number of polyphases by shifting the relative timing when a received symbol sequence oversampled based on a predetermined number of oversamplings is down-sampled based on the inverse of the predetermined number of oversamplings, the received symbol sequences being two types of symbol sequences: a symbol sequence having an odd phase and a symbol sequence having an even phase when the predetermined number of oversamplings is two;
second program code executable by the receiver to cause the receiver to shift by at least one step the timing of at least two of the received symbol sequences that have been polyphased to obtain at least two received symbol sequences;
providing tap coefficient sequences with at least two variables for at least two of the received symbol sequences that have been obtained;
third program code executable by the receiver to cause the receiver to apply feedback from an adaptive algorithm to subsequent down-sampled symbol rates in order to input a described relationship according to a size of the tap coefficients and the received symbol sequences as the size of the tap coefficients changes;
fourth program code executable by the receiver to cause the receiver to monitor the position of the tap coefficient indicating the maximum size among a plurality of tap coefficients based on a comparison of the sizes of the tap coefficients; and
fifth program code executable by the receiver to cause the receiver to shift the positions of all tap coefficients and simultaneously skipping or overlapping any one of the oversampled received symbol sequences when the position of the monitored tap coefficient indicating the maximum size has moved to a different tap coefficient position.

9. The computer program product executed in the receiver according to claim 8 further comprising:
sixth program code executable by the receiver to cause the receiver to shift by at least two steps the timing of at least two of the received symbol sequences that have been polyphased to obtain at least three received symbol sequences; and
seventh program code executable by the receiver to cause the receiver to provide tap coefficient sequences with at least three variables for at least two of the received symbol sequences that have been obtained.

10. The computer program product according to claim 8, wherein the initial value of the tap coefficient is established as follows:

$$X(z)=1/H(z)Y(z)$$

where z indicates the symbol rate
in order to represent the response of a channel including multi-path interference and inter-symbol interference as a Z-conversion H(z) and to restore a transmitted symbol sequence X(z) from a received symbol sequence Y(z), and
zero-order, first-order, second-order, etc. coefficients are assigned to the tap coefficient when a Taylor expansion is performed at z=0 to obtain an FIR-type digital filter configuration.

* * * * *